United States Patent
Krishnamurthy et al.

(10) Patent No.: US 9,882,383 B2
(45) Date of Patent: Jan. 30, 2018

(54) SMART POWER DELIVERY NETWORK

(71) Applicant: INTEL CORPORATION, Santa Clara, CA (US)

(72) Inventors: Harish K. Krishnamurthy, Hillsboro, OR (US); Khondker Z. Ahmed, Atlanta, GA (US); Krishnan Ravichandran, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 357 days.

(21) Appl. No.: 14/581,903

(22) Filed: Dec. 23, 2014

(65) Prior Publication Data

US 2016/0181803 A1  Jun. 23, 2016

(51) Int. Cl.
*H02J 3/00* (2006.01)
*H02J 3/14* (2006.01)
*H02J 1/10* (2006.01)

(52) U.S. Cl.
CPC . *H02J 3/00* (2013.01); *H02J 1/10* (2013.01)

(58) Field of Classification Search
CPC .......... H02J 1/10; H02J 3/00; H02J 2001/106
USPC ....................................................... 307/31
See application file for complete search history.

(56) References Cited

U.S. PATENT DOCUMENTS

| 7,085,943 B2 * | 8/2006 | Chun ................ G06F 1/3203 713/300 |
|---|---|---|
| 2012/0131356 A1 | 5/2012 | Han |
| 2014/0068284 A1 | 3/2014 | Bhandaru et al. |
| 2014/0082377 A1 | 3/2014 | Dinh et al. |
| 2014/0181538 A1 | 6/2014 | Shrall et al. |
| 2016/0099564 A1* | 4/2016 | Luh ........................ H02J 3/00 307/31 |

FOREIGN PATENT DOCUMENTS

JP  2008-090760  4/2008

OTHER PUBLICATIONS

International Search Report and Written Opinion received for PCT Patent Application No. PCT/US2015/062121, dated Apr. 8, 2016, 10 pages.

* cited by examiner

*Primary Examiner* — Carlos Amaya (57) ABSTRACT

Examples may include a smart power delivery network using voltage regulators to supply combined power sufficient to meet a peak load demand generated from one load from among multiple possible loads. A system of power gate devices having controllers may assist in dynamically steering current driven by the voltage regulators to the multiple possible loads.

24 Claims, 11 Drawing Sheets

SUPPLY COMBINED POWER FROM A FIRST AND A SECOND VOLTAGE REGULATOR TO A PLURALITY OF LOADS SUCH THAT THE COMBINED POWER IS SUFFICIENT TO SUPPLY A PEAK LOAD DEMAND GENERATED FROM ONE OF THE PLURALITY OF LOADS
502

DELIVER THE COMBINED POWER TO EACH LOAD OF THE PLURALITY OF LOADS THROUGH A FIRST AND A SECOND POWER GATE DEVICE OR DELIVERING POWER SEPARATELY SUPPLIED FROM THE FIRST OR THE SECOND VOLTAGE REGULATORS TO EACH LOAD
504

ROUTE, AT RESPECTIVE FIRST AND SECOND CONTROLLER FOR THE FIRST AND SECOND POWER GATE DEVICES, THE COMBINED OR THE SEPARATELY SUPPLIED POWER THROUGH THE FIRST AND SECOND POWER GATE DEVICES FOR DELIVERY TO ONE OR MORE LOADS OF THE PLURALITY OF LOADS
506

CONTROL, AT A VOLTAGE IDENTIFICATION (VID) CONTROLLER, RESPECTIVE INCOMING VIDS FOR THE FIRST AND SECOND VOLTAGE REGULATORS SUCH THAT A SAME REGULATED VOLTAGE OR ONE OR MORE DIFFERENT REGULATED VOLTAGES ARE TO BE OUTPUTTED BY THE FIRST AND SECOND VOLTAGE REGULATORS
508

MODIFY THE RESPECTIVE INCOMING VIDS BY ADDING A GUARDBAND AMOUNT OF POWER TO EACH OF THE RESPECTIVE INCOMING VIDS TO COMPENSATE FOR A POWER DROP ACROSS THE FIRST OR SECOND POWER GATE DEVICE
510

PROVIDE THE MODIFIED INCOMING VIDS TO RESPECTIVE DESTINATION VOLTAGE REGULATORS FROM AMONG THE FIRST OR SECOND VOLTAGE REGULATORS
512

Sub-System 700

Controller 120-n

Power Gate Device 130-n

SMART POWER DELIVERY NETWORK

GOVERNMENT RIGHTS

This invention was made with Government support under contract number FA8650-13-3-7338 awarded by the Department of Defense. The Government has certain rights in this invention.

TECHNICAL FIELD

Examples described herein are generally related to routing power supplied from multiple voltage regulators.

BACKGROUND

Some of today's microprocessors are designed to employ a performance enhancing technique referred to as turbo boosting or dynamic overclocking. Turbo boosting may enhance performance by utilizing energy credits accumulated from earlier low power operations or modes. A microprocessor capable of turbo boosting may be placed in a lower performance and lower thermal mode of operation to enable elements (e.g., cores) of the microprocessor to cash the energy credit and push the microprocessor and/or hosting computing platform above a thermal design point (TDP). A power delivery unit for these types of microprocessors needs to include voltage regulators with a delivery capability to supply sufficient power to meet a peak load demand generated during turbo boosting.

DETAILED DESCRIPTION

As contemplated in the present disclosure, a power delivery unit for microprocessors capable of turbo boosting or dynamic overclocking needs to include voltage regulators with a delivery capability to supply sufficient power to meet a peak load demand generated during turbo boosting. Fully integrated voltage regulators (FIVRs) included on a same die or chip with these types of microprocessors may be designed to supply power to meet the peak load demand. The peak load demand, for example, may be approximately 3× that of a nominal or a low workload demand for individual cores of a multi-core microprocessor. For example, in a multi-core microprocessor system having four cores, the combine power supplying capacity of all FIVRs may be 12× of what is needed to supply a thermal design point (TDP) current (Icc) of a single core. However, microprocessors capable of turbo boosting may allow only one core to operate in a full turbo boost mode at a time while other cores may operate at a low workload having only a nominal load demand. For this example, the maximum system peak demand doesn't exceed 6× of what is needed to supply the TDP Icc of the single core (=one core at turbo (3× TDP) and the other three cores at TDP). This overdesign may result in on-die voltage regulators occupying more area on the die and being more costly to manufacture than what may be needed to support turbo boost peak load demands. For a high-end multi-core processor utilizing current process technologies (e.g., 10 nanometer (nm)), costs-to-manufacture impacts may be significant. Also, since each FIVR may be designed to be most efficient at ~3× TDP, an efficiency penalty may occur when not supplying power to meet turbo boost peak load demands (which may be >99.9% of the time for typically operating environments). Therefore, efficiency/power penalties due to this over design may be problematic. It is with respect to these and other challenges that the examples described herein are needed.

A smart power delivery network may be deployed that includes a first and a second voltage regulator capable of supplying combined power to a plurality of loads such that the combined power is sufficient to supply a peak load demand generated from one of the plurality of loads (e.g., cores of a multi-core processor). The smart power delivery network may also include a first and a second power gate device capable of delivering the combined power to each load of the plurality of loads or capable of delivering power separately supplied from the first or the second voltage regulators to each load. The smart power delivery network may also include respective first and second controllers for the first and second power gate devices to route the combined or the separately supplied power through the first and second power gate devices for delivery to one or more loads of the plurality of loads. In some examples, the smart power delivery network may also include a voltage identification (VID) controller to control respective incoming VIDs for the first and second voltage regulators such that a same regulated voltage or one or more different regulated voltages are to be outputted by the first and second voltage regulators to supply either the peak load demand or a non-peak load demand.

In some examples, the first and second voltage regulators or even additional voltage regulators may be part of a smart power delivery network to supply either peak load demand or non-peak load demand to the plurality of loads in a way that enables these demands to be met in an efficient, power saving and space saving (if deployed on a same chip or die) manner. For example, the first and second voltage regulators may supply power for peak demands generated by one or more loads or may be able to individually meet lower, non-peak demands generated by the one or more loads to enable one of these voltage regulators to be turned off as described in more detail below.

Figure 1:
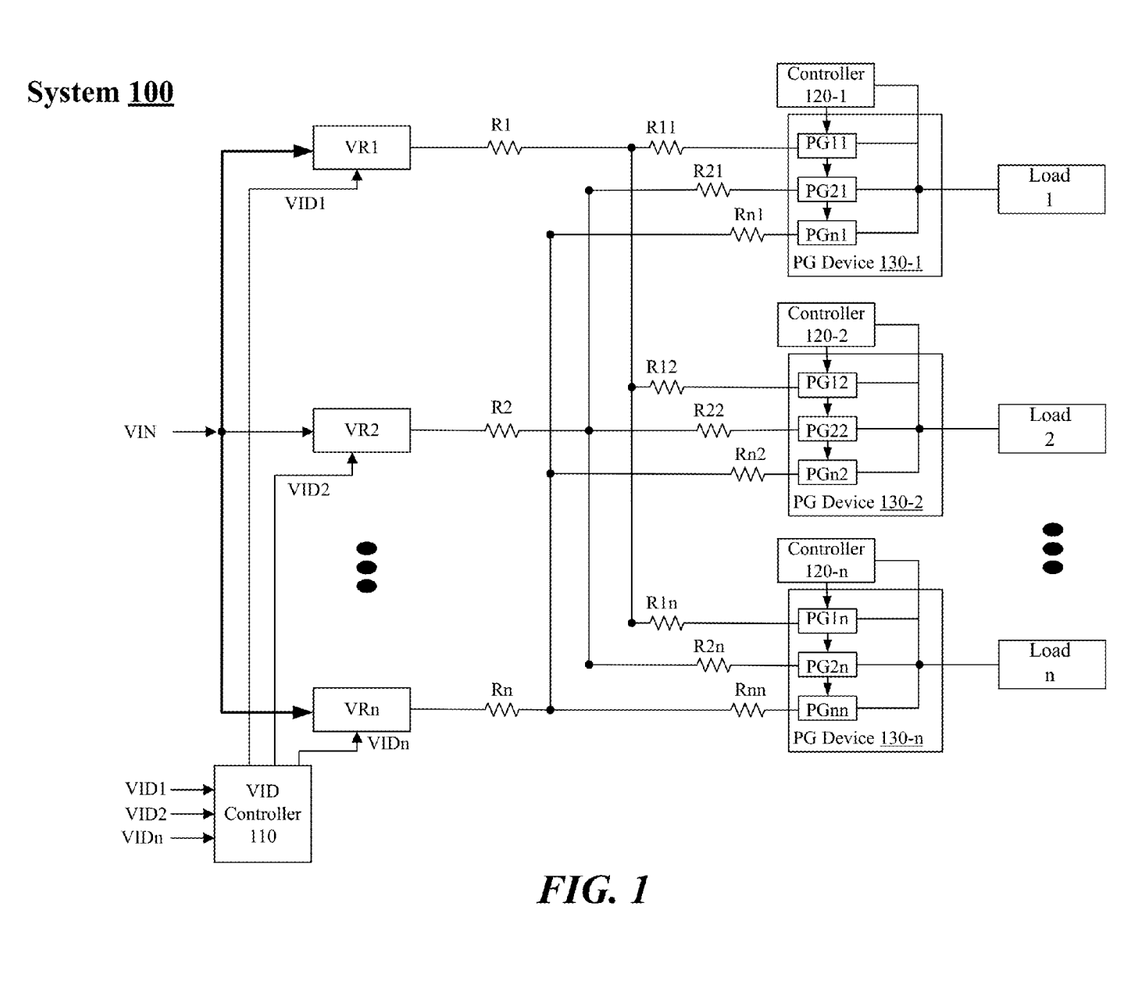
FIG. 1 illustrates an example first system.

FIG. 1 illustrates an example first system. As shown in FIG. 1, the example first system includes a system 100. In some examples, as shown in FIG. 1, system 100 includes a voltage identification (VID) controller 110 capable of controlling VID1 to VIDn ("n" equals any positive whole integer>1) to cause voltage regulators (VRs) VR1, VR2 and VRn to output regulated voltages to load 1 to load n. As shown in FIG. 1, VRs VR1 to VRn may receive source power via voltage in (VIN). VIN may be generated from a power source (not shown) external to system 100 such as power rails at a computing platform. The computing platform may host load 1, load 2 or load n that may receive regulated voltages outputted from VR1, VR2 or VRn.

According to some examples, as shown in FIG. 1, system 100 also includes power gate (PG) devices 130-1, 130-2 and 130-n. Each PG device 130-1, 130-2 and 130-n may have a respective controller 120-1, 120-2 and 120-n. As described more below, controllers 120-1, 120-2 or 120-n may work in collaboration with VID controller 110 and respective PG devices 130-1, 130-2 and 130-n to route power separately supplied from VR1, VR2 or VRn for delivery to at least one of loads 1, 2 or n. Controllers 120-1, 1202 or 120-n may be capable of regulating current in each respective path and maintain voltage at the output delivered to loads 1, 2 or n.

In some examples, power supplied by VR1, VR2 or VRn may drive current to load 1, load 2 or load n through various paths having resistors (Rs) and PGs. For example, VR1 may drive current to load 1 through R1, R11 and PG11 to supply a load demand generated by load 1. Also, VR1 may drive current to load 2 through R1, R12 and PG 12 to supply a load demand generated by load 2. VR1 may also drive current to load n through R1, R1n and PG1n to supply a load demand generated by load n. VR1 and VRn may drive currents to loads 1, 2 or n in a similar manner using their respective Rs and PGs as shown in FIG. 1.

According to some examples, current supplied by VRs 1, 2 or n may be dynamically steered to one or multiple loads 1, 2 or n in a manner such that a combined or total VR capacity or power supplied is sufficient to supply a peak load demand generated from one of these multiple loads. In other words, the total VR capacity of VRs 1, 2 or n may be kept equal to a maximum sum of individual load current or demand from one of loads 1, 2 or n. For example, using a scenario of 3× TDP for a given peak demand load generated from a single load from among loads 1, 2, or n, VRs 1, 2, or n may be sized to supply a combined power of 5× of TDP. As a result of using combined power to supply the given peak demand rather than using a single VR to supply the given peak demand, VRs 1, 2 or n may be downsized compared to VRs designed to individually supply power to meet the given peak demand.

FIG. 1 depicts a balance or equal ratio of VRs to loads for system 100. However, this disclosure is not limited to an equal ratio of VRs to loads. In some examples, a system may include any combination of at least two VRs with a plurality of loads. For example, 2 VRs to 2 loads, 2 VRs to 3 loads, 3 VRs to 3 loads, 4 VRs to 3 loads, etc.

According to some examples, the elements of system 100 may be included on a same die or chip as loads 1 to n. For example, loads 1 to n may include cores of a multi-core processor and VID controller 110, VRs 1 to n, controller 120-1 to 120n and PG devices 130-n may be part of a FIVR to provide regulated voltage to these cores. In other examples, some elements of system 100 may be located on and off the same die or chip as loads 1 to n. For example, VRs 1 to n and/or VID controller 110 and may be part of external regulators and/or controllers located at a computing platform hosting the multi-core processor. Therefore, examples are not limited to having all the elements of system 100 being part of a FIVR on a same die or chip as a multi-core processor.

Figure 2:
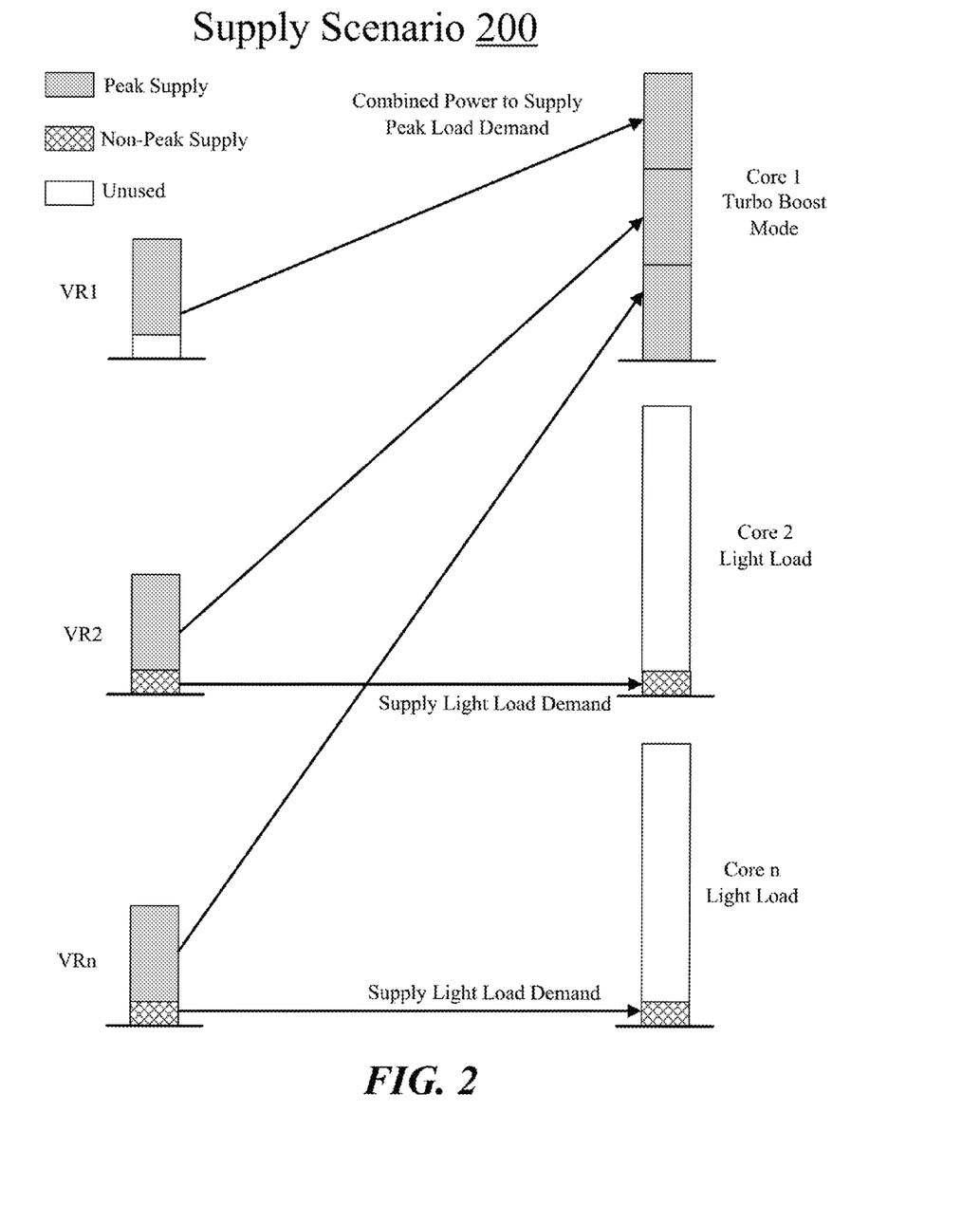
FIG. 2 illustrates an example first supply scenario.

FIG. 2 illustrates an example first supply scenario. As shown in FIG. 2, the example first supply scenario includes scenario 200. In some examples, as shown in FIG. 2, scenario 200 depicts an example supply scenario where a multi-core processor having core 1, core 2 and core n may be supplied combined power from VRs 1, 2 and n. For scenario 200, VR1, VR2 or VRn may be arranged to supply power to cores 1, 2 or n in a similar manner as VR1, VR2 or VRn may supply power to loads 1, 2 or n shown in FIG. 1.

As shown in FIG. 2, core 1 may be in a turbo boost mode and cores 2 and n may be generating a relatively light or nominal load demand. In some examples, VRs 1, 2, may each supply approximately $\frac{1}{3}^{rd}$ of the power needed to meet core 1's peak load demand while in turbo burst mode. Meanwhile, cores 1 and 2 may generate a light load demand. For these examples, as shown in FIG. 2, VR2 may also supply power to meet core 2's light load demand and VRn may also supply power to meet core n's light load demand. A portion of VR1's power supply capacity is shown as unused for supply scenario 200.

Figure 3:
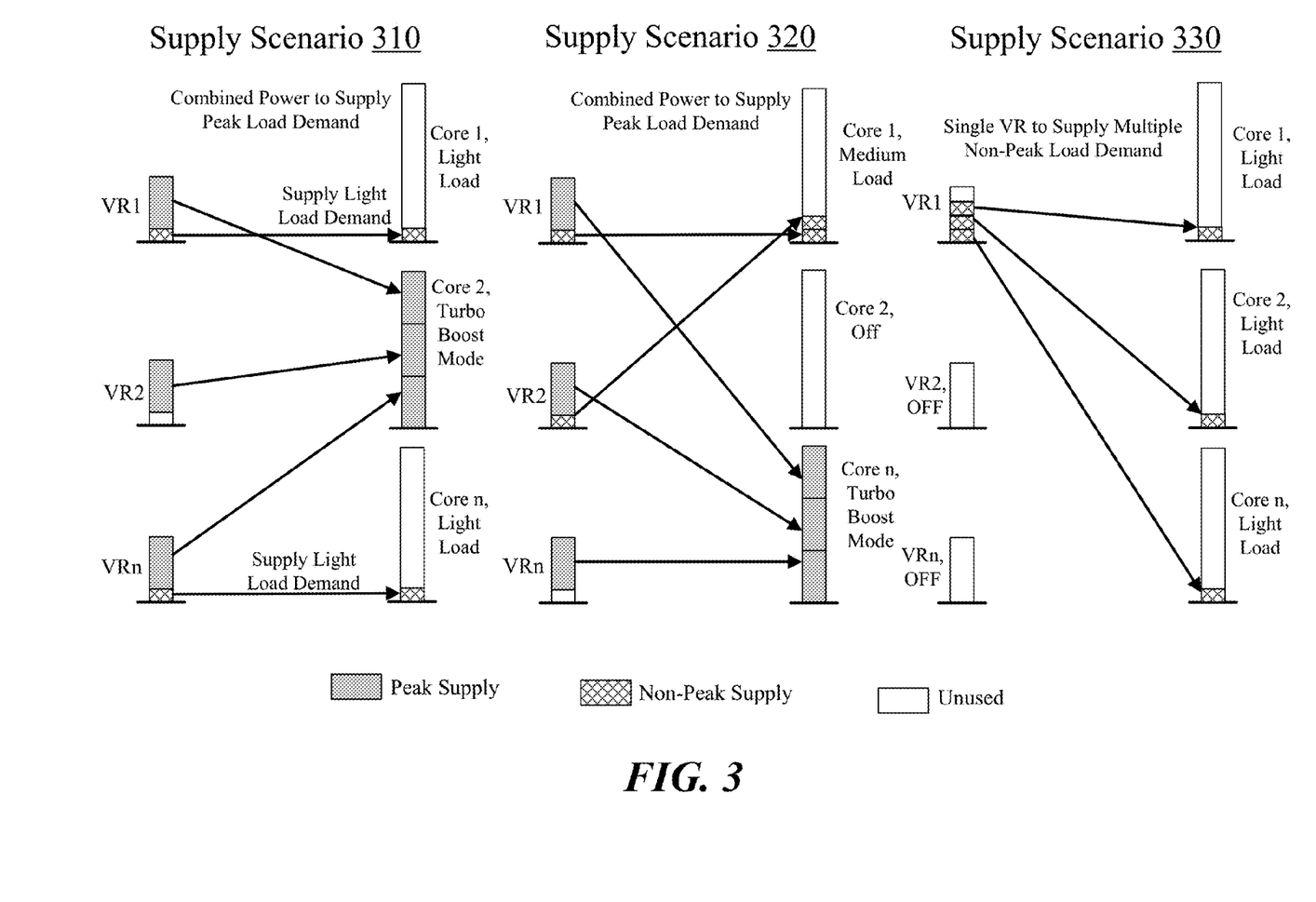
FIG. 3 illustrates example second, third and fourth supply scenarios.

FIG. 3 illustrates example second, third and fourth supply scenarios. As shown in FIG. 3, the example second, third and fourth supply scenarios include supply scenarios 310, 320 and 330, respectively. In some examples, supply scenario 310 is similar to supply scenario 200 shown in FIG. 2 with the exception that Core 2 is in a turbo boost mode and cores 1 and n are generating light load demands. Also, supply scenario 310 shows that VR2 has a portion of unused supply capacity.

According to some examples, supply scenario 320 shows an example where one of the cores may be off, one in turbo boost mode and the other generating a medium load demand. For example, as shown in FIG. 3, core 1 has a medium load demand that has power being supplied from both VR1 and VR2. Meanwhile all three VRs supply combine power to supply a peak load demand generated by core n being in a turbo boost mode. For the example supply scenario 320, VRn may have a portion of unused supply capacity.

In some examples, supply scenario 330 shows an example where all cores may be generating a light load demand. For these examples, a single VR1 may supply power to meet the light load demand for Cores 1, 2 and n. Since VR1 is able to supply power to all three cores, VR2 and VRn may be powered off. This ability to power off VRs while still providing power to all cores via a single VR may save considerable power during times when all cores are operating but are operating in modes that do not generate a peak load demand and/or a load demand that exceeds the capacity of a single VR.

Figure 4:
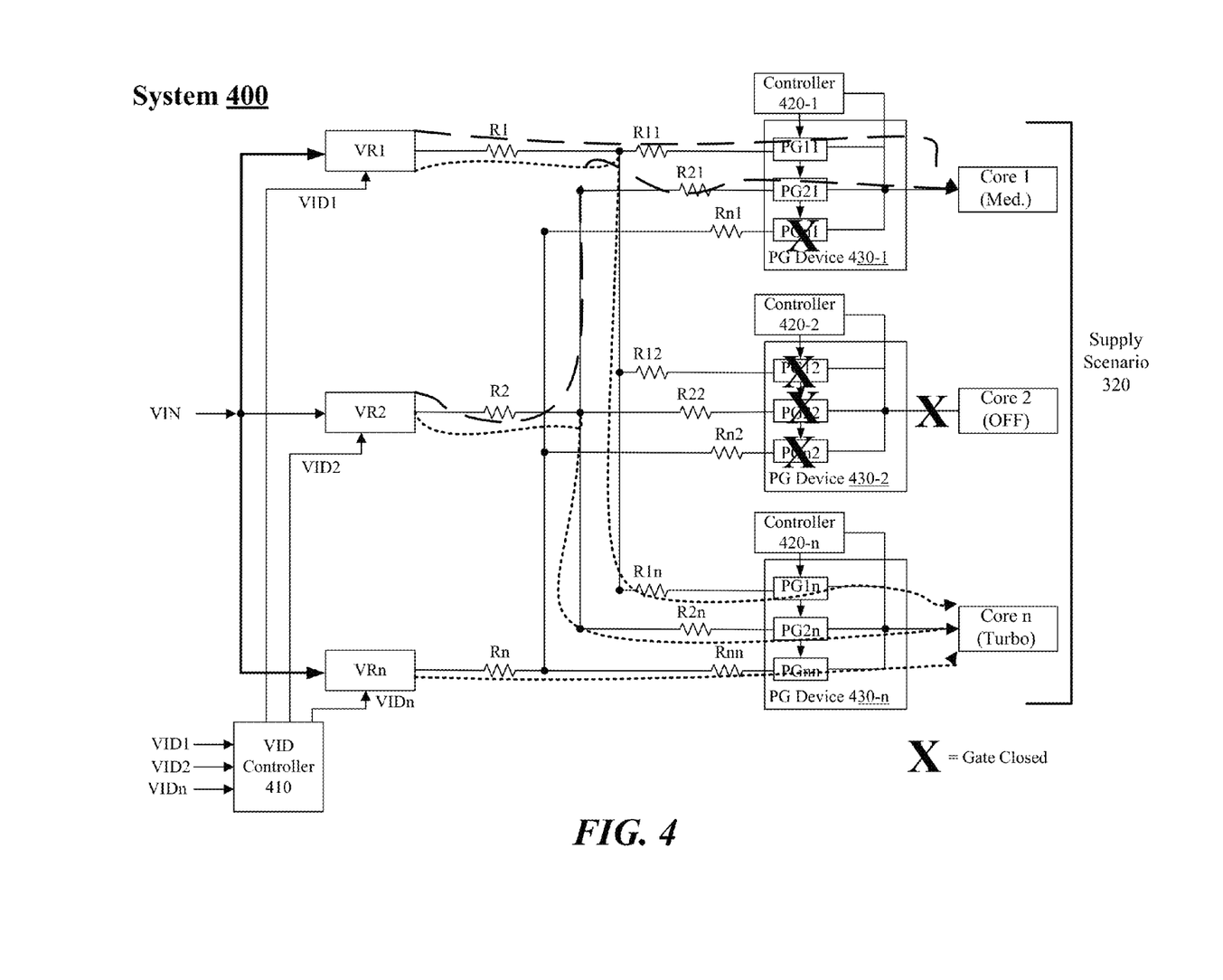
FIG. 4 illustrates an example second system.

FIG. 4 illustrates an example second system. As shown in FIG. 4, the example second system includes system 400. In some examples, as shown in FIG. 4, system 400 depicts an example of how current may be steered to supply power to core 1, core 2 and core n according to scenario 320 mentioned above for FIG. 3. Current steered or routed to supply core 1's load demand is shown as a dashed line and current routed to supply core n's load demand is shown as a dotted line.

In some examples, VID controller 410 may control incoming VID1, VID2 and VIDn such that a same regulated voltage or one or more different regulated voltages may be outputted by VRs 1, 2 and n. For example, VID1 may cause VR1 to supply enough power to supply of portion of core 1's non-peak demand load and to supply both a first portion of core n's peak demand load. VID2 may cause VR2 to also supply enough power to supply both a second portion of core 1's non-peak demand load and to supply a portion of core n's peak demand load. VIDn may cause VRn to supply only a portion of core n's peak demand load.

According to some examples, as shown in FIG. 4, all the PGs included in PG device 430-2 may be gated due to core 2 being off. Also, PG device 430-1 may gate PGn1 since VRn is not supplying power for core 1's non-peak demand load.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
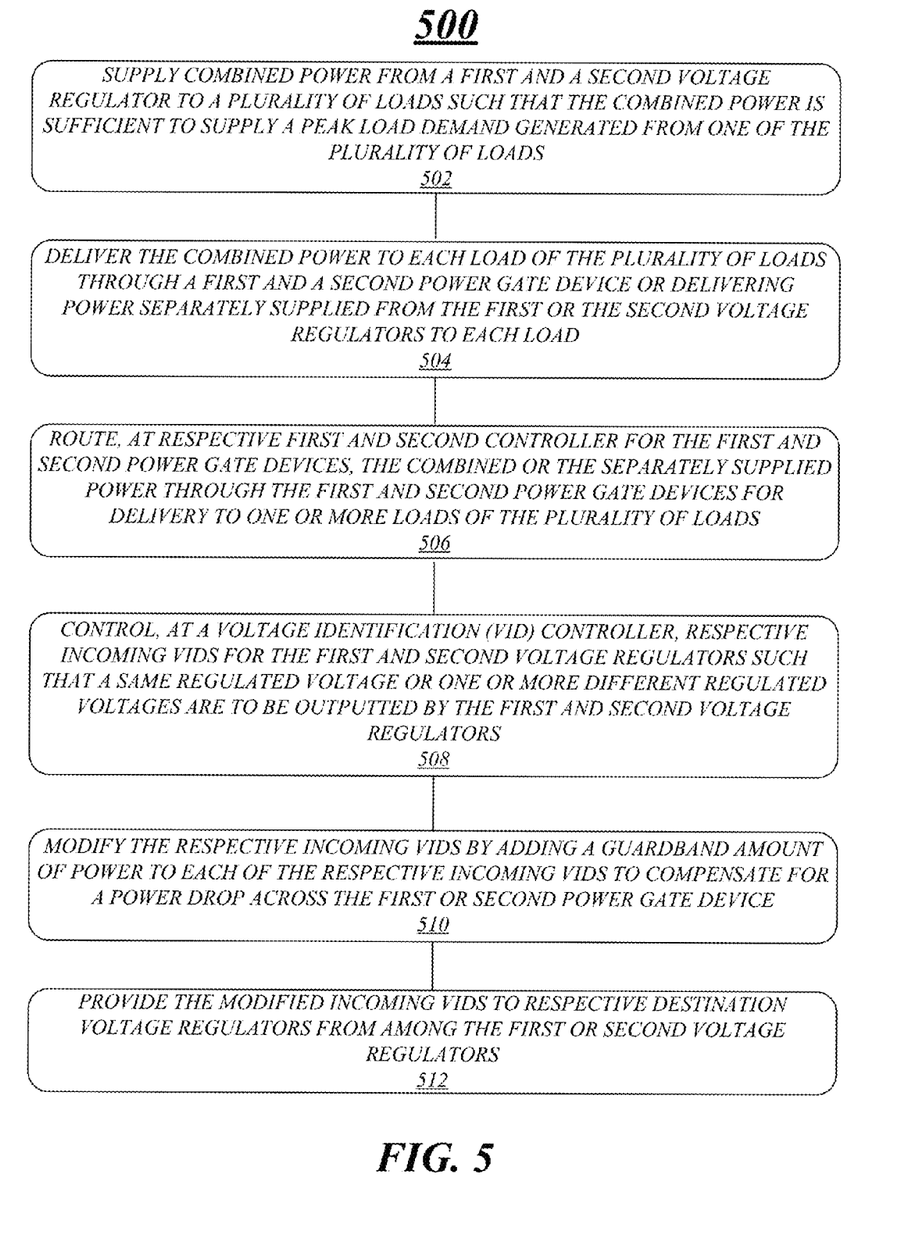
FIG. 5 illustrates an example of a logic flow.

FIG. 5 illustrates an example of a logic flow 500. Logic flow 500 may be representative of some or all of the operations executed by one or more logic, features, or devices described herein, such as shown in FIG. 1 or 4. More particularly, logic flow 500 may be implemented by logic and/or features of a system having a smart power delivery network such systems 100 or 400 shown in FIGS. 1 and 4.

According to some examples, logic flow 500 at block 502 may supply combined power from a first and a second voltage regulator to a plurality of loads such that the combined power is sufficient to supply a peak load demand generated from one of the plurality of loads. For these examples, the first and second voltage regulators may include VR1, VR2 or VRn and the plurality of loads may include load 1, load 2 or load n.

In some examples, logic flow 500 at block 504 may deliver the combined power to each load of the plurality of loads through a first and a second power gate device or delivering power separately supplied from the first or the second voltage regulators to each load. For these examples, the first and second power gate devices may include PG devices 130-1, 130-2 or 130-n.

According to some examples, logic flow 500 at block 506 may route, at respective first and second controllers for the first and second power gate devices, the combined or the separately supplied power through the first and second power gate devices for delivery to one or more loads of the plurality of loads. For these examples, the respective first and second controllers may include controllers 120-1, 120-2 or 120-n.

In some examples, logic flow 500 at block 508 may control, at a VID controller, respective incoming VIDs for the first and second voltage regulators such that a same regulated voltage or one or more different regulated voltages are to be outputted by the first and second voltage regulators. For these examples, the VID controller may include VID controller 110 and the respective incoming VIDs may include VID1, VID2 or VIDn.

According to some examples, logic flow 500 at block 510 may modify the respective incoming VIDs by adding a guardband amount of power to each of the respective incoming VIDs to compensate for a power drop across the first or second power gate device. For these examples, the guardband may allow the VIDs to be slightly raised to account for possible power drops that may have not been contemplated by the source that generated the incoming VIDs (e.g., a power management module implemented by an operating system).

In some examples, logic flow 500 at block 512 may provide the modified incoming VIDs to respective destination voltage regulators from among the first or second voltage regulators. For these examples, VID controller 110 may provide the incoming VID1, VID2 or VIDn to respective VR1, VR2 or VRn.

Figure 6:
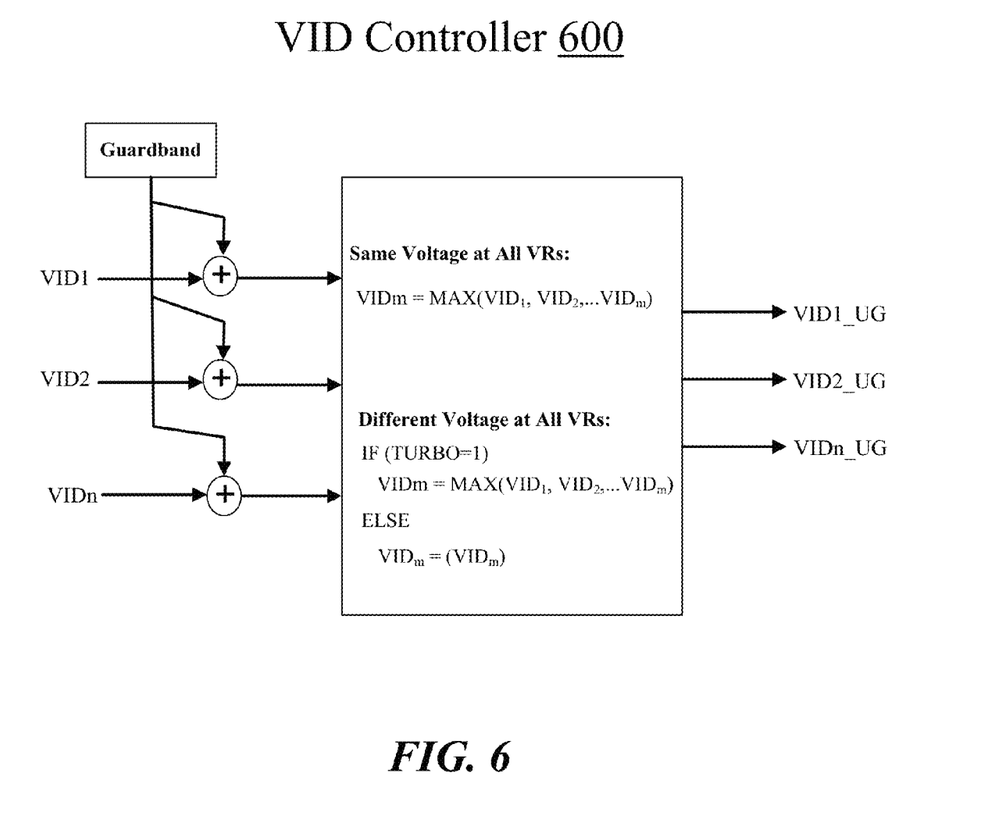
FIG. 6 illustrates an example of a voltage identification (VID) controller.

FIG. 6 illustrates an example of a VID controller 600. In some examples, as shown in FIG. 6, VID controller 600 may be capable of modifying incoming VIDs and generates un-gated VIDs (VID_UGs). VID-UGs, for example, may be provided to VRs included in a smart power delivery network such as those shown in FIGS. 1 and 4. VID controller 600 may add a guardband to the incoming VID to compensate for possible voltage drops across one or more power gating devices.

In some examples, both a 'same VID' and 'different VID' may be provided to the VRs. Same or different VID may depend on system requirements, user demand or may be switched on line as well. The two control principles of same or different VID may vary in terms of regular operation. Both of these control principles generate a same VID_UG (maximum of the incoming VIDs) for all VRs when any load or core is under a peak load demand (e.g., turbo boosting or dynamic overclocking mode). However, for non-peak load demands, the 'different VID' control principle/mechanism may generate different VIDs to different VRs according to incoming VID, while the same VID control principle/mechanism generates same VIDs (maximum of incoming VIDs). The different VID principle/mechanism may help to improve efficiency in certain operations, as mentioned above for the various supply scenarios and described more below for various sharing scenarios.

Figure 7:
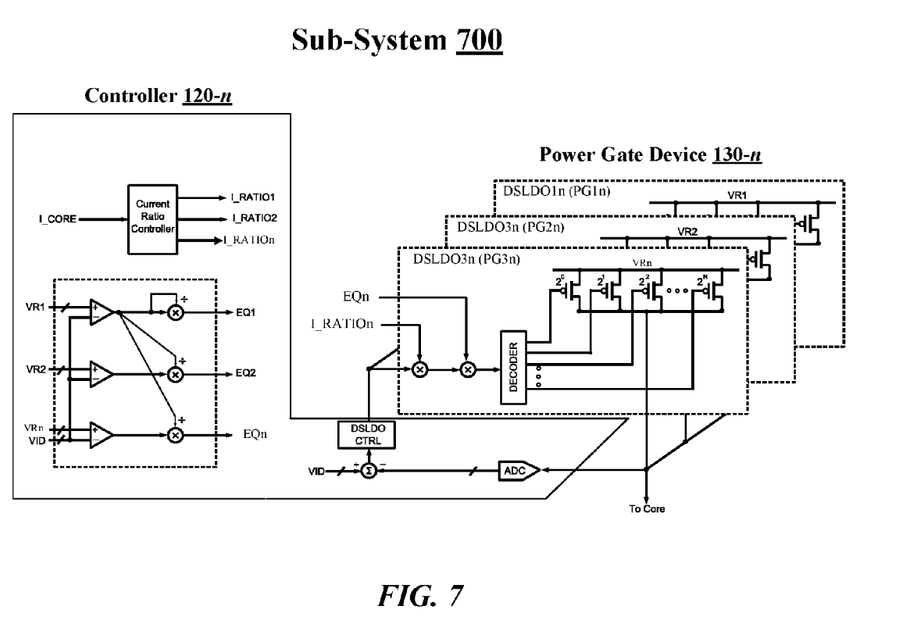
FIG. 7 illustrates an example of a sub-system of the first system.

FIG. 7 illustrates an example of a sub-system 700 of system 100. In some examples, as shown in FIG. 7, sub-system 700 depicts a more detailed view of controller 120-n and power gate device 130-n from system 100 shown in FIG. 1. For these examples, PG1n, PG2n and PG3n of power gate device 130-n are shown as being composed of digital synthesizable low-dropouts (DSLDOs) 1n, 2n and 3n. Controller 120-n is shown as having additional control circuitry.

According to some examples, DSLDOs 1n, 2n and 3n may be capable of being controlled by controller 120-n such that multiple power gating segments may be connected to different input voltages and generate a single output voltage to a load or core. The additional circuitry included in controller 120-n may decide how many active PGs are needed in each segments to maintain a same voltage output from different voltage inputs. Different operating characteristics of each PG in these three segments may be determined by a current ratio controller and input equalizer multiplier included in controller 120-n. The current ratio (I_RATIO) is either user provided or is system generated depending on the core current level (I_CORE). The input equalizer included in controller 120-n may monitor the three voltage differences across the three PGs (namely the difference from VR1 to Vcore1, VR2 to Vcore1 and VR3 to Vcore1). These differences may then be used to generate a relative ratio termed as equalizer ratio (marked as $EQ_{1\ldots n}$ in FIG. 7). The equalizer ratio may then be multiplied along with the current ratio to determine the number of active PGs in the power gate train provided by power gate device 130-n.

Figure 8:
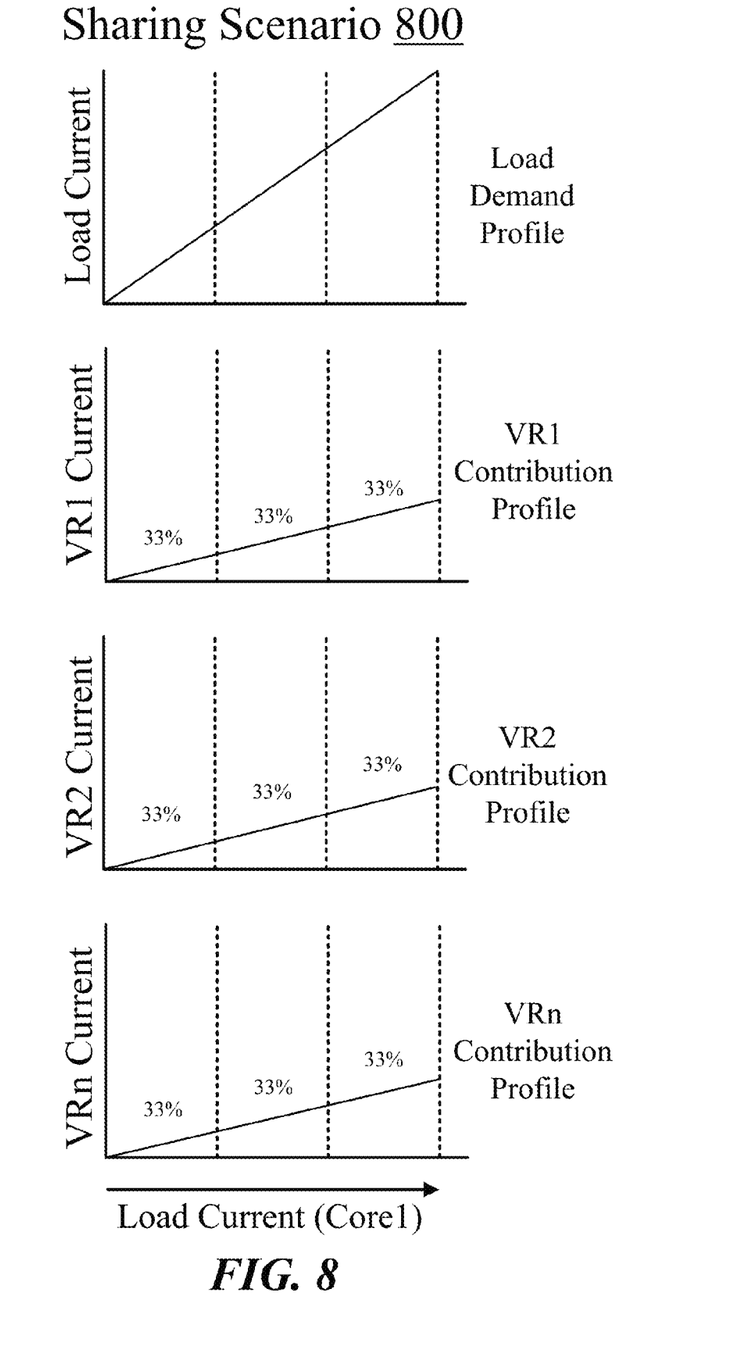
FIG. 8 illustrates an example first sharing scenario.

FIG. 8 illustrates an example first sharing scenario. As shown in FIG. 8, the example first sharing scenario includes sharing scenario 800. In some examples, VRs such as those shown in FIGS. 1 and 4 may jointly provide power in order to share current, especially during peak demand loads such as those associated with a core in a turbo boost or dynamic overclocking mode. Sharing scenario 800 shows a first method for sharing that has VR1, VR2 and VRn each sharing ⅓ or 33% of the load current. For these examples, the VRs may be connected to the load at all times, and due to a same output impedance of the VRs, all may share an equal portion of the load. This first method may be termed as simultaneously activated equal sharing.

Figure 9:
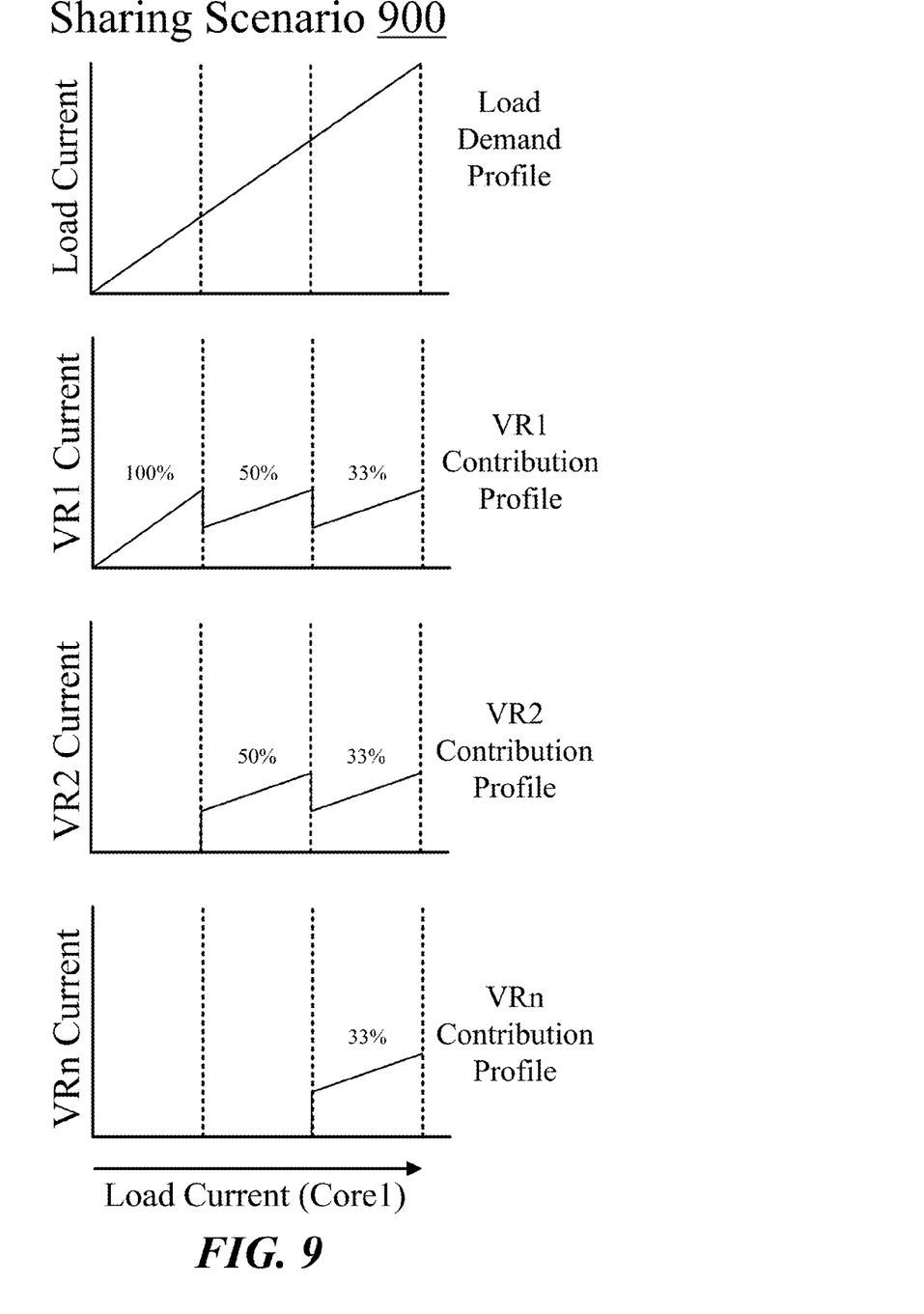
FIG. 9 illustrates an example first sharing scenario.

FIG. 9 illustrates an example second sharing scenario. As shown in FIG. 9, the example second sharing scenario includes sharing scenario 900. Sharing scenario 900 shows a second method for sharing that may be termed as sequentially activated equal sharing that has VR1 providing 100% of the power for the load current at a lower load. As the load demand increases, VR2 turn on and shares 50% of the load demand. As the load continues to increase, VRn turns on and shares 33% or ⅓$^{rd}$ of the load demand.

In some examples, for this second method, if multiple VRs are active or on at any time, all the VRs share the load demand. However, depending on the load demand profile, the VRs are activated sequentially or not all at once. For this second method, the activation of VRs may be load dependent. Hence, a load current detection technique may be needed to implement this second method.

Figure 10:
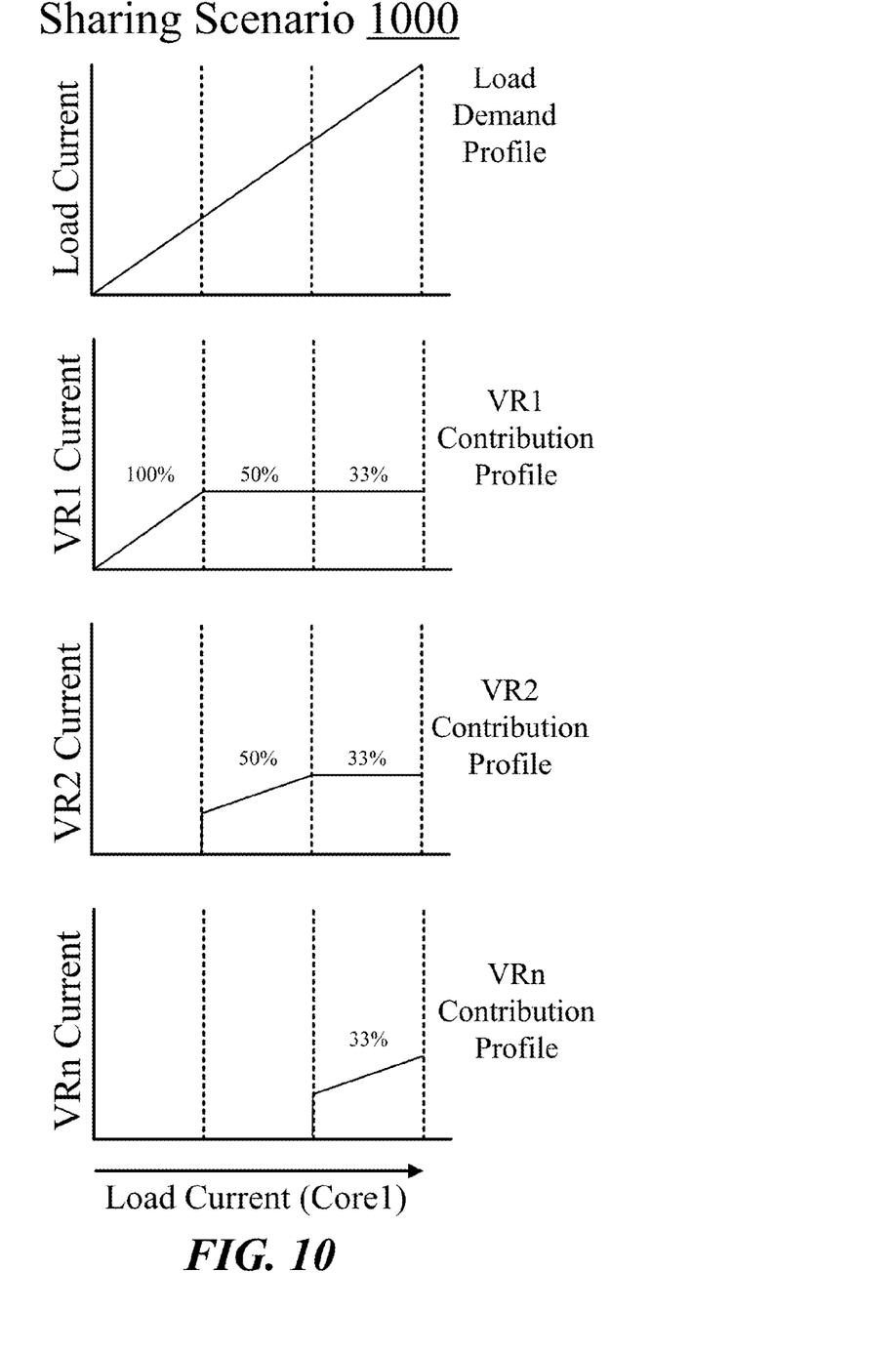
FIG. 10 illustrates an example first sharing scenario.

FIG. 10 illustrates an example third sharing scenario. As shown in FIG. 10, the example third sharing scenario includes sharing scenario 1000. Sharing scenario 1000 shows a third method for sharing that may be termed as sequentially activated variable sharing. For this third method, the VRs may be turned on sequentially similar to sharing scenario 900, however VR1 may be kept at its full load while additional power is supplied from VR2 to meet additional current demand as the load current increases. The sharing ratio changes and eventually when the current demand equals the sum of the combined power supply capability of VR1 and VR2, they share equally. Similarly, as the load current increases further, VRn is activated and the additional power is supplied by VRn to meet this further current demand. This third method may need both load sensing and a sharing ratio controller.

Figure 11:
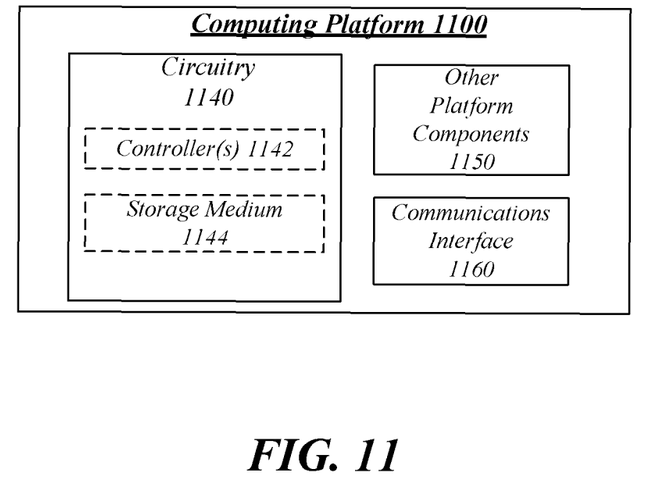
FIG. 11 illustrates an example computing platform.

FIG. 11 illustrates an example computing platform 1100. In some examples, as shown in FIG. 11, computing platform 1100 may include a processing component 1140, other platform components or a communications interface 1160. According to some examples, computing platform 1100 may be part of a host computing platform as mentioned above.

According to some examples, processing component 1140 may execute processing operations or logic for one or more controller(s) 1142 (e.g., VID controllers or other types of controllers for voltage regulators) and/or storage medium 1144. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, sub-routines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the SMBus specification, the PCI Express specification or the USB specification that includes the USB-PD specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3").

Computing platform 1100 may be part of a computing device functioning as a USB host for a USB device. The computing device may include, but is not limited to a computer, a personal computer (PC), a desktop computer, a laptop computer, a notebook computer, a netbook computer, a tablet computer, an ultra-book computer. In some examples, the computing device functioning as the USB host and the USB device may both be part of a convertible or 2-in-1 computer. For these examples, the USB host may be a base computing platform including computing, memory, storage and input (e.g., keyboard) capabilities and the USB device may be a removable touch screen tablet having stand-alone computing, memory and storage capabilities. Accordingly, functions and/or specific configurations of computing platform 1100 described herein, may be included or omitted in various embodiments of computing platform 1100, as suitably desired.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1 is an apparatus including a first and a second voltage regulator capable of supplying combined power to a plurality of loads such that the combined power is sufficient to supply a peak load demand generated from one of the plurality of loads. The apparatus may also include a first and a second power gate device capable of delivering the combined power to each load of the plurality of loads or capable of delivering power separately supplied from the first or the second voltage regulators to each load. The apparatus may also include respective first and second controllers for the first and second power gate devices to route the combined or the separately supplied power through the first and second power gate devices for delivery to one or more loads of the plurality of loads.

Example 2 includes the subject matter of Example 1, further including a VID controller to control respective incoming VIDs for the first and second voltage regulators such that a same regulated voltage or one or more different regulated voltages are to be outputted by the first and second voltage regulators.

Example 3 includes the subject matter of Example 2, the VID controller may modify the respective incoming VIDs by adding a guardband amount of power to each of the respective incoming VIDs to compensate for a power drop across the first or second power gate device. The apparatus may also provide the modified incoming VIDs to respective destination voltage regulators from among the first or second voltage regulators.

Example 4 includes the subject matter of Example 2, the VID controller may control the respective incoming VIDs such that during a peak load demand from one of the plurality of loads, the same regulated voltage is to be outputted by the first and second voltage regulators.

Example 5 includes the subject matter of Example 4, the VID controller may control the respective incoming VIDs such that during a non-peak load demand from the plurality of loads, the same regulated voltage is to be outputted by the first and second voltage regulators.

Example 6 includes the subject matter of Example 4, the VID controller may control the respective incoming VIDs such that during a non-peak load demand from the plurality of loads, the one or more different regulated voltages are to be outputted by the first and second voltage regulators.

Example 7 includes the subject matter of Example 6, the VID controller may control the respective incoming VIDs such that the first voltage regulator has a first VID from among the incoming VIDs. For these examples, the first VID may cause the first voltage regulator to be turned on to supply power to meet the non-peak load demand from the plurality of loads while the second voltage regulator is only turned on if the non-peak load demand rises to a level for which the first voltage regulator having the first VID is unable to supply sufficient power.

Example 8 includes the subject matter of Example 7, the VID controller may control the first VID and a second VID from among the incoming VIDs such that the first and second voltage regulators equally share the non-peak load demand following the second voltage regulator being turned on.

Example 9 includes the subject matter of Example 2, the plurality of loads may include cores of a multi-core processor. For these examples, the first and second voltage regulators, the first and second power gate devices, the respective first and second controllers for the first and second power gate devices and the VID controller may be located on a same die as the multi-core processor. The peak load demand may be generated from a first core of the multi-core processor responsive to the first core operating in a turbo boost or dynamic overclocking mode.

Example 10 includes the subject matter of Example 1, the plurality of loads may include cores of a multi-core processor.

Example 11 includes the subject matter of Example 10, the first and second voltage regulators, the first and second power gate devices and the respective first and second controllers for the first and second power gate devices may be located on a same die as the multi-core processor.

Example 12 includes the subject matter of Example 11, the peak load demand may be generated from a first core of the multi-core processor responsive to the first core operating in a turbo boost or dynamic overclocking mode.

Example 13 is a method including supplying combined power from a first and a second voltage regulator to a plurality of loads such that the combined power is sufficient to supply a peak load demand generated from one of the plurality of loads. The method may also include delivering the combined power to each load of the plurality of loads through a first and a second power gate device or delivering power separately supplied from the first or the second voltage regulators to each load. The method may also include routing, at respective first and second controllers for the first and second power gate devices, the combined or the separately supplied power through the first and second power gate devices for delivery to one or more loads of the plurality of loads.

Example 14 includes the subject matter of Example 13, comprising controlling, at a VID controller, respective incoming VIDs for the first and second voltage regulators such that a same regulated voltage or one or more different regulated voltages are to be outputted by the first and second voltage regulators.

Example 15 includes the subject matter of Example 14, comprising modifying the respective incoming VIDs by adding a guardband amount of power to each of the respective incoming VIDs to compensate for a power drop across the first or second power gate device. The method may also include providing the modified incoming VIDs to respective destination voltage regulators from among the first or second voltage regulators.

Example 16 includes the subject matter of Example 12, comprising controlling the respective incoming VIDs such that during a peak load demand from one of the plurality of loads, the same regulated voltage is to be outputted by the first and second voltage regulators.

Example 17 includes the subject matter of Example 16, comprising controlling the respective incoming VIDs such that during a non-peak load demand from the plurality of loads, the same regulated voltage is to be outputted by the first and second voltage regulators.

Example 18 includes the subject matter of Example 16, comprising controlling the respective incoming VIDs such that during a non-peak load demand from the plurality of loads, the one or more different regulated voltages are to be outputted by the first and second voltage regulators.

Example 19 includes the subject matter of Example 18, comprising controlling the respective incoming VIDs such that the first voltage regulator has a first VID from among the incoming VIDs. For these examples, the first VID may cause the first voltage regulator to be turned on to supply power to meet the non-peak load demand from the plurality of loads while the second voltage regulator is only turned on if the non-peak load demand rises to a level for which the first voltage regulator having the first VID is unable to supply sufficient power.

Example 20 includes the subject matter of Example 19, comprising controlling the first VID and a second VID from among the incoming VIDs such that the first and second voltage regulators equally share the non-peak load demand following the second voltage regulator being turned on.

Example 21 includes the subject matter of Example 14, the plurality of loads may include cores of a multi-core processor. For these examples, the first and second voltage regulators, the first and second power gate devices, the respective first and second controllers for the first and second power gate devices and the VID controller may be located on a same die as the multi-core processor. The peak load demand may be generated from a first core of the multi-core processor responsive to the first core operating in a turbo boost or dynamic overclocking mode.

Example 22 includes the subject matter of Example 13, the plurality of loads may include cores of a multi-core processor.

Example 23 includes the subject matter of Example 22, the first and second voltage regulators, the first and second power gate devices and the respective first and second controllers for the first and second power gate devices may be located on a same die as the multi-core processor.

Example 24 includes the subject matter of Example 23, the peak load demand may be generated from a first core of the multi-core processor responsive to the first core operating in a turbo boost or dynamic overclocking mode.

Example 25 is at least one machine readable medium including a plurality of instructions that in response to being executed on a computing device may cause the computing device to carry out a method according to any one of claims 13 to 24.

Example 26 is an apparatus including means for performing the methods of any one of claims 13 to 24.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a first and a second voltage regulator to supply combined power to a plurality of loads such that the combined power is sufficient to supply a peak load demand generated from one or more of the plurality of loads;
a first and a second power gate device to deliver the combined power to each of a first and a second load of the plurality of loads and delivering power separately supplied from the first or the second voltage regulators to each of the first and second load, the first power gate device to receive a first voltage from the first voltage regulator, receive a second voltage from the second voltage regulator, the second voltage different than the first voltage, and generate a third voltage based on the first and second voltages, the third voltage to power the first load; and
respective first and second controllers for the first and second power gate devices to route the combined or the separately supplied power through the first and second power gate devices for delivery to one or more loads of the plurality of loads.

2. The apparatus of claim 1, comprising:
a voltage identification (VID) controller to control respective incoming VIDs for the first and second voltage regulators such that a same regulated voltage or one or more different regulated voltages are to be outputted by the first and second voltage regulators.

3. The apparatus of claim 2, comprising:
the VID controller to modify the respective incoming VIDs by adding a guardband amount of power to each of the respective incoming VIDs to compensate for a power drop across the first or second power gate device; and
provide the modified incoming VIDs to respective destination voltage regulators from among the first or second voltage regulators.

4. The apparatus of claim 2, comprising the VID controller to control the respective incoming VIDs such that during a peak load demand from one of the plurality of loads, the same regulated voltage is to be outputted by the first and second voltage regulators.

5. The apparatus of claim 4, comprising the VID controller to control the respective incoming VIDs such that during a non-peak load demand from the plurality of loads, the same regulated voltage is to be outputted by the first and second voltage regulators.

6. The apparatus of claim 4, comprising the VID controller to control the respective incoming VIDs such that during a non-peak load demand from the plurality of loads, the one or more different regulated voltages are to be outputted by the first and second voltage regulators.

7. The apparatus of claim 6, comprising the VID controller to control the respective incoming VIDs such that the first voltage regulator has a first VID from among the respective incoming VIDs, the first VID to cause the first voltage regulator to be turned on to supply power to meet the non-peak load demand from the plurality of loads while the second voltage regulator is only turned on if the non-peak load demand rises to a level for which the first voltage regulator having the first VID is unable to supply sufficient power.

8. The apparatus of claim 7, comprising the VID controller to control the first VID and a second VID from among the respective incoming VIDs such that the first and second voltage regulators equally share the non-peak load demand following the second voltage regulator being turned on.

9. The apparatus of claim 2, the plurality of loads comprising cores of a multi-core processor, the first and second voltage regulators, the first and second power gate devices, the respective first and second controllers for the first and second power gate devices and the VID controller are located on a same die as the multi-core processor, the peak load demand generated from a first core of the multi-core processor responsive to the first core operating in a turbo boost or dynamic overclocking mode.

10. The apparatus of claim 1, the plurality of loads comprising cores of a multi-core processor.

11. The apparatus of claim 10, the first and second voltage regulators, the first and second power gate devices and the respective first and second controllers for the first and second power gate devices are located on a same die as the multi-core processor.

12. The apparatus of claim 11, the peak load demand generated from a first core of the multi-core processor responsive to the first core operating in a turbo boost or dynamic overclocking mode.

13. A method comprising:
supplying combined power from a first and a second voltage regulator to a plurality of loads such that the combined power is sufficient to supply a peak load demand generated from one or more of the plurality of loads;

delivering the combined power to each of a first and a second load of the plurality of loads through a first and a second power gate device and delivering power separately supplied from the first or the second voltage regulators to each of the first and second load, receiving a first voltage from the first voltage regulator at the first power gate device;

receiving a second voltage from the second voltage regulator at the first power gate device, the second voltage different than the first voltage;

generating a third voltage based on the first and second voltages, the third voltage to power the first load; and routing, at respective first and second controllers for the first and second power gate devices, the combined or the separately supplied power through the first and second power gate devices for delivery to one or more loads of the plurality of loads.

14. The method of claim 13, comprising:

controlling, at a voltage identification (VID) controller, respective incoming VIDs for the first and second voltage regulators such that a same regulated voltage or one or more different regulated voltages are to be outputted by the first and second voltage regulators.

15. The method of claim 14, comprising:

modifying the respective incoming VIDs by adding a guardband amount of power to each of the respective incoming VIDs to compensate for a power drop across the first or second power gate device; and providing the modified incoming VIDs to respective destination voltage regulators from among the first or second voltage regulators.

16. The method of claim 14, controlling the respective incoming VIDs such that during a peak load demand from one of the plurality of loads, the same regulated voltage is to be outputted by the first and second voltage regulators.

17. The method of claim 16, controlling the respective incoming VIDs such that during a non-peak load demand from the plurality of loads, the same regulated voltage is to be outputted by the first and second voltage regulators.

18. The method of claim 16, controlling the respective incoming VIDs such that during a non-peak load demand from the plurality of loads, the one or more different regulated voltages are to be outputted by the first and second voltage regulators.

19. The method of claim 18, controlling the respective incoming VIDs such that the first voltage regulator has a first VID from among the respective incoming VIDs, the first VID to cause the first voltage regulator to be turned on to supply power to meet the non-peak load demand from the plurality of loads while the second voltage regulator is only turned on if the non-peak load demand rises to a level for which the first voltage regulator having the first VID is unable to supply sufficient power.

20. The method of claim 19, controlling the first VID and a second VID from among the respective incoming VIDs such that the first and second voltage regulators equally share the non-peak load demand following the second voltage regulator being turned on.

21. The method of claim 14, the plurality of loads comprising cores of a multi-core processor, the first and second voltage regulators, the first and second power gate devices, the respective first and second controllers for the first and second power gate devices and the VID controller are located on a same die as the multi-core processor, the peak load demand generated from a first core of the multi-core processor responsive to the first core operating in a turbo boost or dynamic overclocking mode.

22. The method of claim 13, the plurality of loads comprising cores of a multi-core processor.

23. The method of claim 22, the first and second voltage regulators, the first and second power gate devices and the respective first and second controllers for the first and second power gate devices are located on a same die as the multi-core processor.

24. The method of claim 23, the peak load demand generated from a first core of the multi-core processor responsive to the first core operating in a turbo boost or dynamic overclocking mode.

\* \* \* \* \*